United States Patent
Lauck

(10) Patent No.: US 6,206,131 B1
(45) Date of Patent: *Mar. 27, 2001

(54) TRACTION CONTROL SYSTEM FOR HYDRAULIC DRIVES

(75) Inventor: Robert B. Lauck, San Juan Capistrano, CA (US)

(73) Assignee: ZMC Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/877,591

(22) Filed: Jun. 17, 1997

(51) Int. Cl.$^7$ .................................................. B60K 17/10
(52) U.S. Cl. .......................................... 180/305; 180/197
(58) Field of Search ..................... 180/197, 242, 180/243, 305, 308; 60/494; 137/485, 487.5, 538

(56) References Cited

U.S. PATENT DOCUMENTS

| | | | |
|---|---|---|---|
| 4,236,595 | * 12/1980 | Beck et al. ........................... | 180/197 |
| 4,484,655 | * 11/1984 | Sheppard, Sr. ........................ | 180/305 |
| 4,494,624 | * 1/1985 | Scheuerle et al. .................... | 180/308 |
| 4,813,447 | * 3/1989 | Ichiryu et al. ........................ | 137/487.5 |
| 4,984,165 | * 1/1991 | Müller et al. ......................... | 180/197 |
| 5,199,525 | * 4/1993 | Schueler ............................... | 180/242 |
| 5,347,812 | * 9/1994 | Nilsson et al. ......................... | 60/494 |
| 5,421,545 | * 6/1995 | Schexnayder ....................... | 137/487.5 |
| 5,660,198 | * 8/1997 | McClaran ........................... | 137/487.5 |
| 5,730,041 | * 3/1998 | Fillion et al. ......................... | 180/197 |

FOREIGN PATENT DOCUMENTS

| | | | |
|---|---|---|---|
| 2260916 | * 6/1974 | (DE) ................................... | 180/197 |
| 3636260 | * 5/1988 | (DE) ................................... | 180/197 |
| 207761 | * 8/1988 | (JP) ..................................... | 180/197 |

* cited by examiner

Primary Examiner—Frank Vanaman
(74) Attorney, Agent, or Firm—Frederick Gotha

(57) ABSTRACT

A traction control module for a hydrostatic drive that has a hydraulic pump which drives at least two hydraulic wheel motors in a parallel closed looped configuration with each wheel motor. The traction control has a branch flow path that is in parallel with a main flow path. A dynamically balanced slidable valve acts between the main and the branch flow paths to control fluid flow to the associated wheel motor. When the load on one of the wheels is partially, but not entirely lost, the slidable valve reacts to maintain system pressure at substantially its preexisting level.

3 Claims, 6 Drawing Sheets

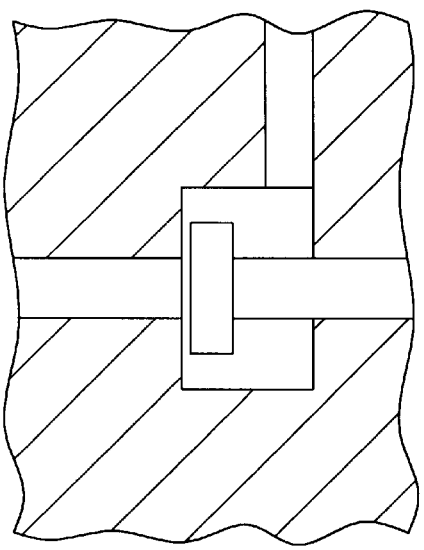
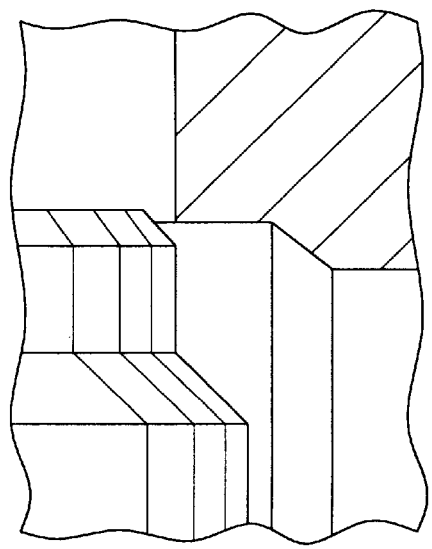
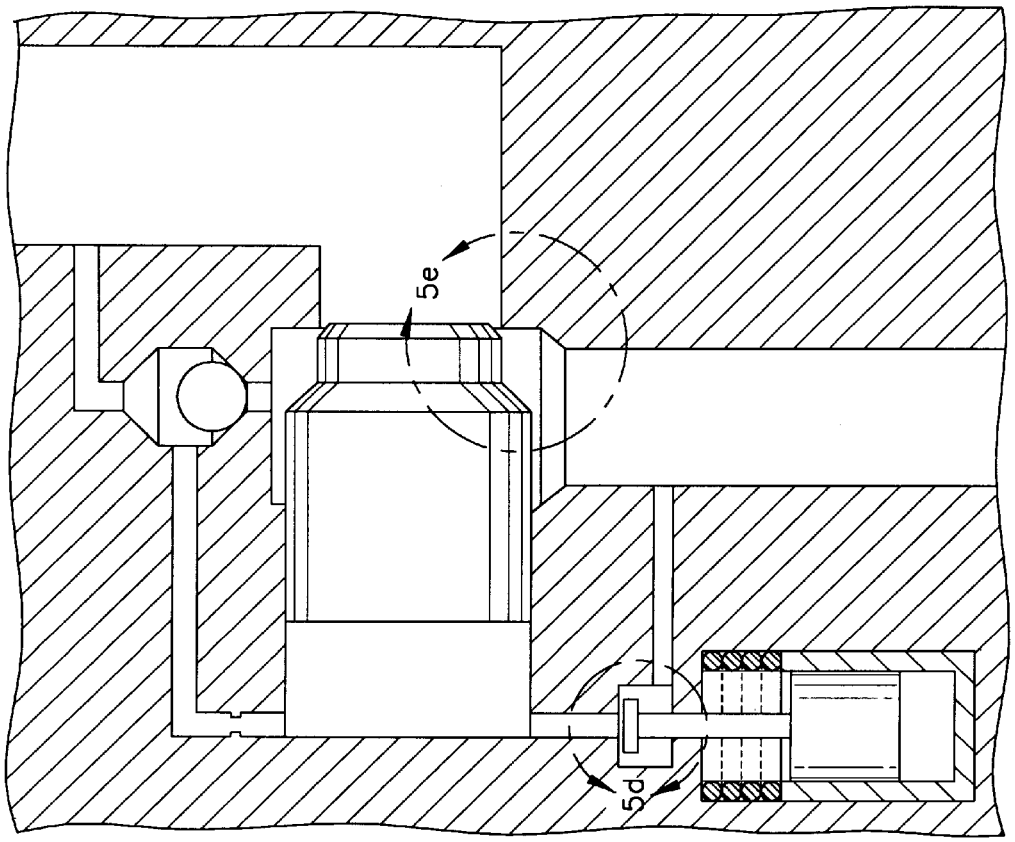

TRACTION CONTROL SYSTEM FOR HYDRAULIC DRIVES

TECHNICAL FIELD OF THE INVENTION

This invention relates to a vehicular hydrostatic drive system having at least two actuators.

BACKGROUND OF THE INVENTION

There is known in the prior art various types of drive systems for propelling a vehicle. These systems include, for example, internal combustion engines utilizing mechanical transmissions, electric drive systems and hydraulic drive or hydraulic systems. The latter type of system typically includes an internal combustion engine for supplying the power to drive a hydraulic pump which displaces pressurized hydraulic drive fluid to the vehicle wheel motors, commonly referred to as actuators, through various control valves and fluid conduits. Hydraulic drive systems have evolved into sophisticated and often complex arrangements and have found acceptance as a drive system in vehicles used in specialty areas such as construction, agricultural and industrial applications. While hydraulic drive systems function in an acceptable manner, they are not particularly suited for the highly competitive mass-produced passenger vehicle market because of their extremely high cost, complexity and operating drawbacks.

Where hydraulic systems are used to power vehicles, each wheel used to drive the vehicle is rotatably connected to an actuator. Each actuator furnishes the torque necessary to overcome the frictional engagement of the ground with its respective wheel. The pressure drop across each actuator is a function of the torque required by that actuator. The system operates correctly when each tire exhibits similar or identical loads.

In the basic hydrostatic and hydraulic power system, the pressure drop across each motor is equal to the pressure difference delivered by the pump. When all drivable wheels are engaged on similar ground, the load required of each associated drive motor is equal. Therefore, the flow rates to each of the motors and the pressure drops across each of the motors are identical. In the situation just described, the system operates correctly.

Operating problems can occur when not all wheels are in frictional engagement with ground surfaces having the same coefficient of friction. Wheels in contact with a ground surface having a lower coefficient of friction will begin to slip, causing more flow to be directed through the reduced load motor, which in turn reduces the displacement pump pressure and overall efficiency of the hydrostatic system, since a disproportionate amount of the hydraulic flow will take the path of least resistance and flow through the reduced-load actuator.

An example will illustrate. In a four-wheel drive system with an actuator at each wheel, a drive wheel contacting a ground surface having a low friction coefficient such as mud or ice, will slip and spin faster than the other wheels due to a reduced load acting on the actuator connected to that wheel. This results in a reduced pressure drop across that actuator which causes a system wide pressure drop where a larger than necessary portion of the pump displacement flow is directed to the slipping actuator than to the other load-bearing actuators which in fact would need the flow in order to maintain wheel rotation at a desired rate. In the worst case, the resultant system-wide flow pressure is insufficient to provide the necessary traction force for the load bearing wheels to overcome the frictional contact with the ground, and they stall.

In many powered systems there is a need for on-off controls that will either energize a particular part of the system, or cut off the flow of energy to it. If there is a multi-branch system and trouble develops with a particular branch, the remedy would often be to simply shut off power to that branch. In a vehicle drive system where there is a problem of wheel slippage, however, it is convenient to refer to the problem as being the partial loss of a load, rather than a complete loss. In other words, the load is still there and must still receive energy, but the proper operating relationship between fluid pressure and fluid flow rate being supplied to the wheel motor, and countertorque developed by the wheel, has been disrupted. It is therefore desirable to restore the proper balance as quickly as possible.

The present applicant has provided an overview addressing operating problems and the available componentry to control and improve performance of hydraulically powered vehicles in an article published in Hydraulics & Pneumatics, October 1988. The article was entitled "Some thoughts on wheel drives and traction controls for mobile equipment", by Robert B. Lauck.

More recently, an improvement developed by Poclain Hydraulics of France has focused on a system wherein speed sensors are fitted at the motors to detect the rotational speed at each wheel. Each speed signal is transmitted to an electronic card for comparison of wheel speeds. When the rotational speeds between the wheels exceed an allowed rate, the electric card will transmit a signal to a linked solenoid valve associated with the faster rotating or slipping wheel for controlling a spool, which creates a pressure drop on the supply to the slipping wheel, which will reduce its spin rate. In the Poclain system the solenoid valve is actuated by fluid pressure from a line that is referenced to the tank pressure.

OBJECT OF THE INVENTION

One object of the invention is to provide, for a hydrostatic power system having parallel loads, a method of maintaining system pressure when one load is partially but not entirely lost, by changing the operating relationships to partially but not entirely obstruct the flow of fluid to the partially lost load.

It is an object of the present invention to provide a hydrostatic drive system which will compensate for wheel slippage while keeping the system pumping at a substantially constant rate of fluid displacement. A novel object of the invention is to quickly correct and maintain an acceptable system-wide hydraulic flow pressure when there is a slipping wheel condition, in a manner before a steady operating state is attained.

Another object of the present invention is to directly control the pressure drop across a hydaulic control module, regardless of the flow passing through it. A selected current transmitted from a control computer linked to a solenoid valve in a traction control module will rapidly provide the desired pressure drop.

A further object of the invention is to provide a hydrostatic control system incorporating a bi-directional flow capability in a traction control module.

Still a further object of the invention is to reduce the complexity of hydraulic flow lines in a hydrostatically powered vehicle by making it unnecessary to have hydraulic lines extending from a remote tank to each wheel control module.

Still another object of the invention is to provide a traction control valve module which operates solely from the pump pressure, and which is bi-directional in that it still functions in the same way when the direction of the fluid supplied by the pump output and hence the direction of vehicle drive is reversed.

Another and perhaps unrelated object of the present invention is to provide a rapid-response hydraulic control module which is adapted for electronic control and can respond rapidly to reduce or shut off the hydraulic fluid flow to an associated load, either totally or partially, as may be needed.

SUMMARY OF THE INVENTION

The present invention provides a method for improving the operation of a hydrostatic power system having parallel loads, by placing a separate slidable valve in operative relationship to the hydraulic flow path for each load, dynamically balancing each of the slidable valves so that hydraulic flow to its associated load is normally unobstructed, and then when one of the loads is partially but not entirely lost, in response thereto changing the balance of the associated valve so as to partially but not entirely obstruct the hydraulic flow to that load and thereby maintain the system pressure at substantially its pre-existing level.

More specifically, the present invention provides improvements for counteracting wheel slippage in a vehicle having a hydrostatic drive system that incorporates a hydraulic pump driving at least two hydraulic wheel motors in a parallel closed loop configuration, speed sensors to detect wheel rotational speed, a control computer, and a separate traction control module in a series configuration with each wheel motor. According to the present invention each such traction control module is provided with a branch flow path in parallel with its main flow path, and a dynamically balanced slidable valve acting between the main flow path and the branch flow path to control fluid flow to the associated wheel motor. Other than the flow passing through the traction control module and into the motor, no other fluid is delivered to the module.

Further according to the invention the separate traction control module associated with each wheel motor includes a proportional solenoid valve that proportionally controls the movement of the dynamically balanced slidable valve, and the closing action of the slidable valve is essentially proportional to the closing action of the solenoid valve.

A somewhat separate and independent feature of the invention is a rapid-response hydraulic control module which comprises a main fluid flow path, a branch flow path in parallel with the main fluid flow path, a dynamically balanced slidable valve that is slidable between the main flow path and the branch path, and a solenoid valve located in the branch path downstream of the sliding valve to control displacement of the sliding valve into the main flow path. The solenoid valve is proportionally responsive to the magnitude of an applied electrical signal and moves the dynamically balanced valve to partially close off the main flow path creating a pressure drop in proportion to the magnitude of the applied signal.

DRAWING SUMMARY

FIG. 5b is an enlarged view of the solenoid valve of FIG. 5a;

FIG. 5c is a schematic view of the traction control valve module of FIG. 5a with both valves in their nearly fully closed condition corresponding to maximum wheel slippage;

FIG. 5d is an enlarged view of the solenoid valve as shown in the circle in FIG. 5c;

FIG. 5e is an enlarged fragmentary view of the slidable valve as shown in the circle in FIG. 5c;

THE OVERALL TRACTION DRIVE SYSTEM

Figure 1:
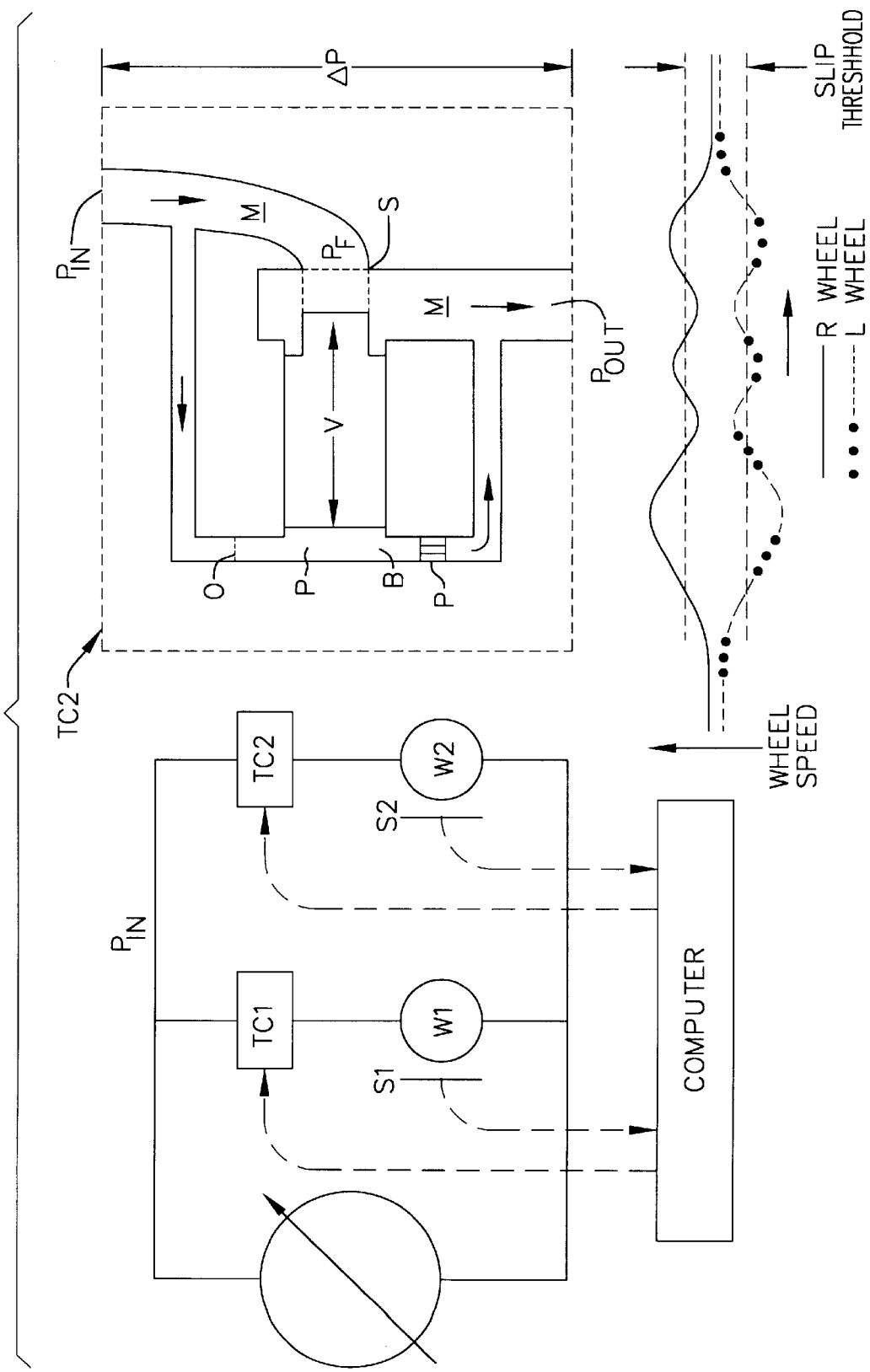
FIG. 1 is a schematic diagram conceptually illustrating a traction control system including a vehicle with two driven wheels, and its dynamic operation in accordance with the present invention for the control of wheel slippage.
Figure 2:
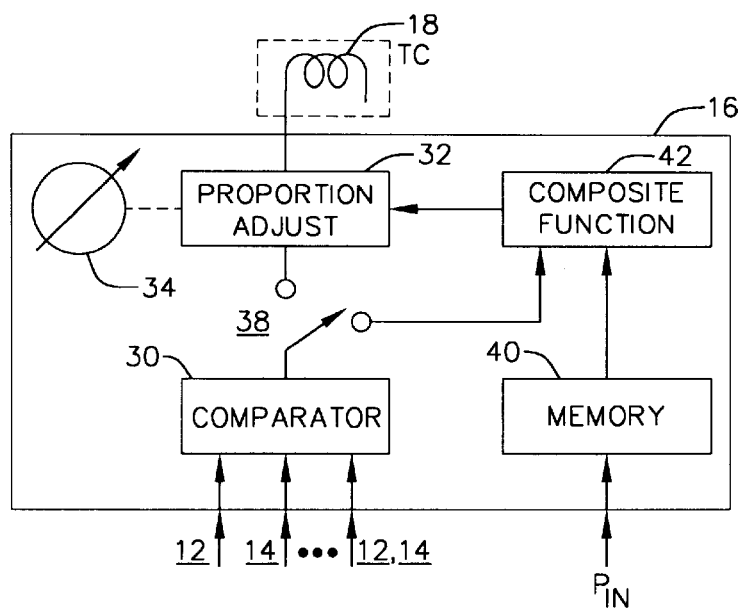
FIG. 2 is a schematic diagram of a control computer and its associated circuitry for the system of FIG. 1.

(Drawing FIGS. 1 and 2)

FIG. 1 illustrates in a schematic form the hydrostatic drive system and its dynamic response to a wheel slippage problem in accordance with the present invention, while FIG. 2 shows the computer through which the control is exercised.

Pump 10 drives hydraulic wheel motors W1 and W2 through parallel, closed loop paths. A traction control device controls each motor, control device TC1 being in a series loop with motor W1 while control device TC2 is in a series loop with motor W2. The pressure level supplied to each of the closed loop motor paths is designated as Pin, representing the discharge pressure of pump 10. A sensing device 12 senses the rotational rate of the wheel that is driven by motor W1, and a sensing device 14 senses the rotational rate of the wheel driven by motor W2. The data from each of the the sensors 12 and 14 is provided to the computer 16, which develops control signals sent to the traction control devices, as necessary.

For the purpose of simplifying the discussion, the control system of FIG. 1 assumes that the vehicle may have four or more wheels, but only two are applying the tractive power. There may be various different operating conditions to which the system may be subjected, but which are not necessarily intertwined with the problem of controlling wheel slippage. Higher tractive drive may be needed when the vehicle starts to go up a hill, or when an increase in speed is desired. The vehicle may need to be slowed down to avoid an impact. Turning a corner will require an increase in speed of one wheel relative to the other, and for that purpose the hydraulic drive inherently acts as a differential drive. The operation will depend to some extent upon the characteristics of the hydraulic drive motors W1 and W2. Fixed displacement motors respond differently than variable displacement motors.

The present invention particularly deals with wheel slippage. A particular wheel may strike a bump or obstruction, or it may encounter a slick surface that will cause it to spin.

According to the present invention an appropriate response to wheel slippage can be provided for either variable or fixed displacement motors. The response to wheel slippage requires a dynamic or transient kind of response, and it is the purpose of the present invention to provide that kind of response. Sensors 12 and 14 may measure wheel speed either directly or indirectly, either at the wheel itself, or on the wheel shaft associated with the wheel, or else a measurement may be made of another parameter such as the rate of fluid flow to the associated motor as being indicative of the wheel speed.

Each traction control device TC1 and TC2 contains a normally open, dynamically balanced, slidable valve member V in in series in main flow path to the hydraulic motor of the associated wheel, as shown for TC2 in the upper right-hand corner of FIG. 1. The main flow path M at its upstream end receives the hydraulic flow from pump 10 at pressure level Pin. The downstream or output end of main flow path M has a pressure level designated as Pout, whose magnitude is equal to the pressure being supplied to the associated motor W2. The module TC2 also includes a branch flow path B, in parallel with the main path M. The upstream end of branch path B also receives the pressure level Pin while its lower or output end has a return connection to the main flow path M on its downstream end at the Pout level. The dynamically balanced slidable valve member V has its front end face exposed to pressure Pf in path M while its rear end face is exposed to pressure Pc in path B. In the dynamically balanced state of valve member V the forces exerted by pressures Pf and Pc are equal if in an intermediate position, and otherwise are nearly equal. The branch path B has an orifice O formed in its upper leg for restricting the flow of fluid from the pump 10 to the rear end face of the sliding valve V. A pilot valve P is located in the lower leg of the branch path B for controlling sliding movement of the dynamically balanced valve V. Pilot valve P is of a proportionally acting solenoid type.

Response to Wheel Slippage

The method of counteracting the slippage of a particular wheel relative to a companion wheel while continuing to drive all other wheels is carried out as follows. Measured parameters indicative of the rotation rates of the particular wheel and its companion wheel are compared to produce a comparison signal. Whenever the comparison signal indicates that slippage of the particular wheel relative to its companion wheel exceeds a predetermined threshold, the adjustable slidable valve V controlling the associated drive motor is moved toward its closed position indicated by dotted lines in FIG. 1, but is not entirely closed. The partial closing action of the adjustable valve V is such as to increase the pressure drop across the module by an amount that is generally proportional to the extent to which the slippage of the particular wheel exceeded the predetermined threshold. Furthermore, the pressure drop across the module can be increased to almost fully equal the supply pressure, if that is necessary. This action raises the pressure drop through the closed loop path containing the motor of the slipping wheel to substantially its pre-slippage level, and makes it possible to maintain the tractive effort of the companion wheel at about the same level that existed before the slipping wheel commenced to slip.

For example, the pump supply pressure may be 3000 psi, but the normal pressure drop across the control module TC1 or TC2 may be only 20 psi. When the pilot valve P is triggered, the pressure drop across the module TC2 may increase to 2000 psi or more, as necessary. A very rapid response is achieved. The factors that are of great importance in achieving this desirable system response include the location of the solenoid valve at near the supply pressure level (i.e., it is like the trigger of a gun already cocked); the generally proportional closing action of the solenoid valve; and the action of the dynamically balanced adjustable valve V which allows it to close partially rather than entirely in response to the computer command transmitted through valve P. Control module TC2 is preferably manufactured in modular form, and no separate hydraulic lines are required to operate pilot valve P.

Before further describing the operation of the system as a whole it will be helpful to first describe in greater detail the structure and operation of control module TC2 as a separate entity.

Hydraulic Control Module—General Description

The most important operating parameters in a hydrostatic power system are the levels of static pressure existing at various points, and losses of static pressure due to flow path restrictions and turbulent flow of the fluid. If the control module TC2 is used in other types of hydraulic systems, gravitational effect, friction with wall surfaces, the dynamic pressure or head from the kinetic energy of the moving stream, and viscosity of the fluid, may also be important.

Figure 3:
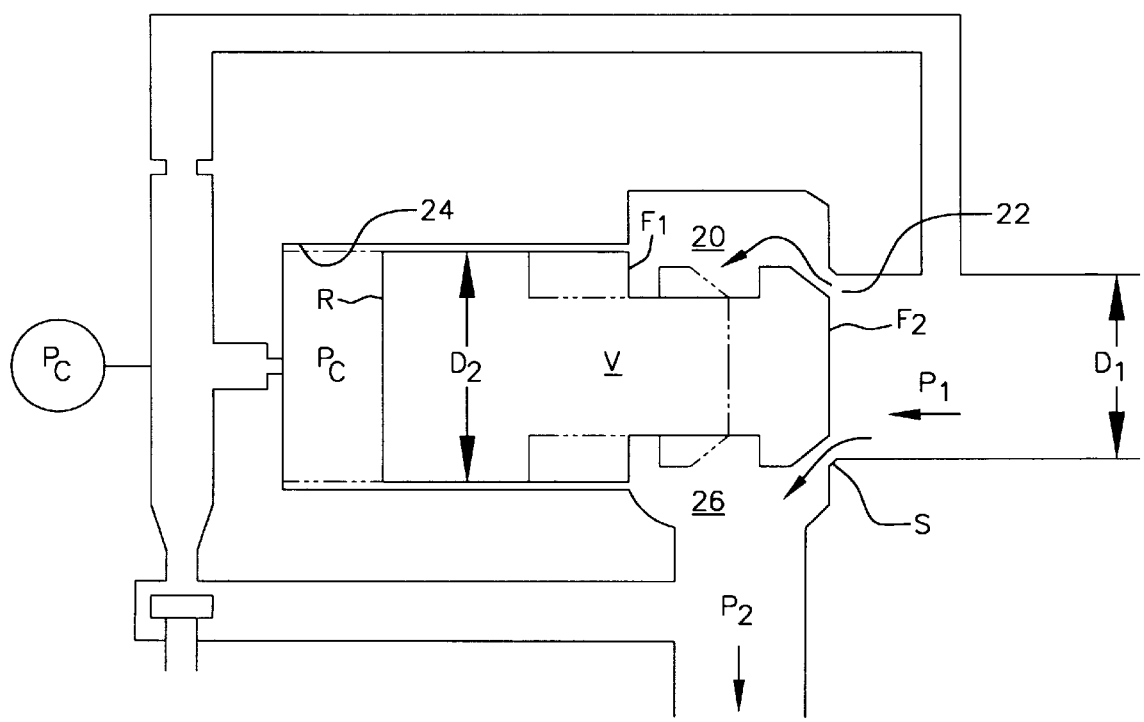
FIG. 3 is a schematic diagram illustrating in more detail the basic configuration of the hydraulic control module in accordance with the present invention.

Referring now specifically to FIG. 3, the dynamically balanced slidable valve member V has its front end exposed to main flow path M while its rearward end is exposed to branch path B. The total static pressure drop $\Delta P$ across the module is divided in each of these paths, the static pressure division in the branch path being mainly determined by the flow resistances of the orifice O in its upper leg and of the pilot valve P in its lower leg. Branch path B is preferably of small cross-section, since solenoid valve P essentially acts as a pilot valve. In the main flow path M the static pressure division occurs partly above the slidable valve V and partly below it, but mainly across it. Pressure P1 on the upstream side may become a great deal different from pressure P2 on the downstream side when valve member V is partially closed.

In the main flow path M a chamber 20 is formed having a first opening 22 with a valve seat S formed therein, a second opening 24 disposed generally parallel to the first opening, and a third opening 26 disposed generally perpendicular to both of the first and second openings. The main hydraulic flow path M is coupled through the first and third openings. The slidable valve V has its front end face selectively movable partially into the chamber 20 through the second opening 24.

As shown in FIG. 3 the dynamically balanced slidable valve member V is elongated and its forward end has longitudinally separated inner and outer end faces F1 and F2, respectively. In alternative language, the front end face of the valve member V may be said to have a projecting portion forming a secondary face whose area is only a portion of its total front end face area. Its rearward end has a single surface area designated as R. In FIG. 3 the normally dynamically balanced position of the valve member V is shown in dotted lines, while its nearly closed position is shown in solid lines. In either position of the valve member its inner face F1 does not protrude into the chamber 20, but its outer end face F2 does so protrude. When fluid is flowing through the main flow path M there is at all times a pressure drop through the chamber 20, and the static pressure on outer face F2 therefore differs from the static pressure on the inner face F1. Slidable movement of the valve member V is adapted to move the outer end face F2 near to engagement with valve seat S so that the fluid force then acting longitudinally on its forward end will be a composite function of both the total area of the two end faces F1 and F2 and the distance separating the outer end face F2 from the valve seat S.

Each end face of the sliding valve V has a large surface, and the static pressure level on various portions of each face will differ at least slightly from the average pressure level across the face. Thus, an average of the static pressure level applied to the rear end face of valve V may be designated as control pressure Pc. An average of the pressure level applied to the front face of valve V may be designated as face pressure Pf. Control pressure Pc divides the pressure drop ΔP through the branch path B. Face pressure Pf also divides pressure drop ΔP through the main path M. In the preferred embodiment of the invention the areas of the two end faces are equal; that is, the area of rearward end face R is equal to the sum of forward inner and outer end faces F1 and F2. In the normally dynamically balanced position of sliding valve V, therefore, Pc=Pf. The fact that it is possible to achieve this dynamic balance is a result of the selected configurations of the valve V and the flow paths M and B.

Valve V is moveably responsive to pressure forces, so that it may slide one way or the other, depending upon the difference in the pressures on its two faces. The exact condition for dynamic balance of valve V depends upon the specific configurations of paths M and B, as well as the position of the solenoid valve P. Valve P is of the proportional type, meaning that a larger current supplied to it causes a larger change in its position. A proportional type of operation for the solenoid valve P is well known, so that the magnetic force generated by the current flowing in the solenoid coil will always determine the degree of valve closing, whether the valve action is static, increasing, or decreasing. Valve P will be partially closed to balance valve member V in its fully open position.

When pilot valve P is closed the lower leg of branch flow path B will be blocked, and the control pressure Pc will rise to nearly equal the pressure supplied to the input ends of the two flow paths. Even assuming that main flow path M is not fully blocked at its output end, a positive closing action then takes place, because total longitudinal force on rearward end face R is approximately double that on outer forward face F2, and the longitudinal force on inner end face F1 is less than that on F2. The closer the outer end face F2 moves to the valve seat S the more the static pressure on inner end face F1 drops, and the greater is the mechanical advantage driving the valve member V from its rearward end, and approaches 2:1. Complete closure of main path M is possible by fully closing the pilot valve P.

Module Used for Positive Control

It is possible to employ the control module TC2 in other applications for a positive type of control, in which an increase or reduction of fluid pressure to the load is initiated by applying a control signal to the control module.

It would then be assumed that the operation of the system is in balance, and that any change in Pin, Pout, or the difference between them, is a dependent variable, not an independent variable. The dynamically balanced state of slidable valve member V may have initially been achieved by having the pilot valve P partially closed so that it presents a flow restriction in branch path B that is comparable to the flow restriction from orifice O. A small closing movement of the solenoid pilot valve P will increase static pressure level on the rear end face R of the slidable valve member V, causing its front face F to protrude as indicated in FIG. 3 by solid lines into the chamber 20. Any movement of the slidable valve member V will in turn introduce resistance to flow and hence a greater pressure drop in the main flow path M. Because of the two different areas F1 and F2 on the front end face of valve member V, if the valve were to fully close with the periphery of area F2 engaging the valve seat S, then just before it closed there would be a positive force differential of nearly 2:1 in favor of driving the closing action. After the closing action is first started and both F1 and F2 are exposed to the main path pressure, the exact progression of events in terms of the pressures acting on each face as a result of incremental displacement of the valve member V may not be precisely known, but it is clear that there is a transition from balanced forces on the two ends of valve member V toward the clearly unbalanced forces.

Since a mechanical advanatage exists in connection with the closing movement of valve member V, in order to reverse that action it may be necessary to open the pilot valve P a great deal, thus greatly reducing its flow resistance.

Module Used for Responsive Control (The Present Invention).

Successful operation of the control module in its responsive mode, i.e., when wheel slippage has occurred, is more difficult. The reason is that the wheel slippage will occur first, and the remedial action must take place afterwards. An increased fluid flow to wheel motor W2 will cause a corresponding increase in fluid flow through the main path M of the control module, making the closing action of the valve member V more difficult to achieve. Nevertheless, the design parameters can be selected so that a substantially full closing of the pilot valve P will cause control pressure Pc to rise sharply, driving valve member V toward its closing position, and its movement toward closing position will increase the mechanical advantage by which it is driven, as previously described. The desired responsive action, a partial closing of the main flow path M, will occur because of the difference in areas between F2 and R. The main path M will not become entirely closed, however, because a small fluid flow will continue through it and through the associated wheel motor. The present invention deals with partial loss of a hydraulic load—i.e., slippage of a wheel driven by a wheel motor—and not the total loss of load such as if the hydraulic line were cut and fluid then allowed to spew out unrestricted.

Novelty arises in that the range of values for the branch path pressure, Pc, applied to the sliding valve, is limited to:

$$Pout \leq Pc \leq Pin$$

Therefore, Pc operates at all times in a narrow range. Wheel slippage causes Pout to drop sharply, and at first Pc also drops accordingly, but then Pc recovers very rapidly due to the electronic control and moves rapidly toward the value of Pin.

When the computer indicates that the closing action of valve member V should be reversed, pilot valve P may be moved to or near to its fully open position, thus reversing the differential force on the two ends of valve member V.

Dynamic System Response

FIG. 1 in the lower right corner indicates the anticipated dynamic response of the system to a slipping wheel. It is assumed that the right wheel slips. A solid line indicates speed of the right wheel as a function of time, while a line of small circles indicates the speed of the left wheel. Two parallel dotted lines indicate the predetermined range of permissible difference in wheel speeds of the two wheels being compared, and hence the threshold level for permissible slippage beyond which corrective action is to be taken.

As shown in the diagram, when the speed of the right wheel exceeds the threshold level, it is only a very short time such as a fraction of a second until the speed of the left wheel drops below an acceptable level. The reason for this slowing of the left wheel is that fluid has started to flow to the slipping right wheel at a greatly increased rate, causing system pressure Pin to drop. The drop in pressure Pin will be temporary, however, because of the dynamic response of the control system. An electrical signal whose strength is proportional to the extent by which the speed of the right wheel exceeds threshold is being applied to the winding 18 of the solenoid valve P, and as slippage increases for a brief time the strength of that signal also increases. The solenoid valve moves in a direction such as to progressively restrict the flow through the branch path B, so that the pressure drop across the orifice O approaches near zero, and the pressure level on the rear end face of valve member V then becomes more nearly equal to Pin. This pressure level on the rear end face of valve V causes the sliding valve to move into the main path M a distance or amount that is also substantially in proportion to the received electrical signal, and assures that the main flow path M will become nearly fully closed; hence, the total pressure drop through the loop including both the main path M of the control module TC and the motor of the slipping wheel may become equal to its own previous value as well as to the total pressure drop that previously existed across the loop including the non-slipping wheel.

There is an inherent problem of oscillation that may occur in the system. The hypothetical curves shown in the lower right of FIG. 1 assume that a small amount of oscillation does occur. The oscillation reflects the fact that the computer may cause the pilot valve P to partially close, then to partially or fully open, and then partially close again. By adjusting the proportionality constant for which the computer is set, the oscillation may be either overdamped, underdamped, or critically damped. The hypothetical curve assumes that the damping is somewhat less than critical, so that limited oscillation will take place.

The Computer Circuitry

As shown in FIG. 2, the Computer 16 receives speed signals 12 and 14, and may produce output signals to the traction control modules TC1 and TC2. The functions of the computer are mainly as follows. The computer compares rotational speed data received from the speed sensors, and when a difference in rotational speed exceeds an allowed value, the computer then transmits an electrical input signal to the proportional solenoid valve for the slipping wheel. The solenoid valve then responsively induces displacement of the dynamically balanced slidable valve V into the main flow path M of the traction control module for the slipping wheel so as to increase the pressure drop across it.

Wheel speeds are compared to determine possible slippage. The comparison result is also measured against a standard threshold to generate an error signal, as no control signal should be generated unless slippage exceeds at least a certain predetermined amount. An electric current is then sent to the appropriate solenoid valve P, whose magnitude is proportional to the error signal and hence substantially proportional to the extent to which wheel speed of the slipping wheel is exceeding the threshold.

Although it is clear that the error signal or control signal generated by the computer must be substantially proportional to indicated wheel slippage, the degree of proportionality may be uncertain. It is desirable to provide the computer with a manually adjustable control, for manually varying or adjusting the proportionality constant. Thus the signals 12 and 14 are fed into a comparator 30 which compares their values against each other, and at the same time against the predetermined threshold level. The output from the comparator 30 may then be fed to a Proportion Adjust circuit 32, whose operation may be manually controlled by a knob 34. The output signal from the Proportion Adjust circuit is then fed to solenoid coil 18 in a traction control module TC.

The computer 16 actually includes multiple comparators 30 and Proportion Adjust circuits 32, one for each wheel whose possible slippage is to be controlled. A threshold level set as a negative bias in one comparator must be set as a positive bias in another comparator, and the output of each Proportion Adjust circuit is delivered to a different traction control module.

Another function of the computer is to store a record of the driving hydraulic pressure level Pin. Oscillation of the system can be minimized by combining an intelligent response to the now current condition of the vehicle traction system with a remembered record of its previous condition as it existed one second, two seconds, or five minutes earlier. Thus, a Pin signal may be fed to a memory bank 40, whose output is supplied to a Composite Function calculator 42. If the Composite Function calculator is to be used, it also receives the output of Comparator 30 through a selection switch 38. The Proportion Adjust circuit 32 will then receive its input from Composite Function calculator 42, rather than directly from the comparator.

The proportional electric current supplied to the solenoid coil 18 may need to have an established maximum value as well as an established minimum threshold level, because the physical traverse of the solenoid valve P is limited by its geometry. Thus, the maximum allowable value of the control current is preferably set to coincide with the maximum traverse that is desired for the movable valve member 46 of the valve P.

While the desired closing actions of both the solenoid valve P and the sliding valve V have been described as proportional, exact proportionality would be too expensive to achieve in a practical embodiment and in fact is not even necessary. When a correction response is too great or too small, the feedback loop through the sensors, the computer, the valves, and the hydraulic circuit, will operate to reduce the error. This is illustrated in FIG. 1, lower right corner.

Dynamic Response Curves

Figure 4:
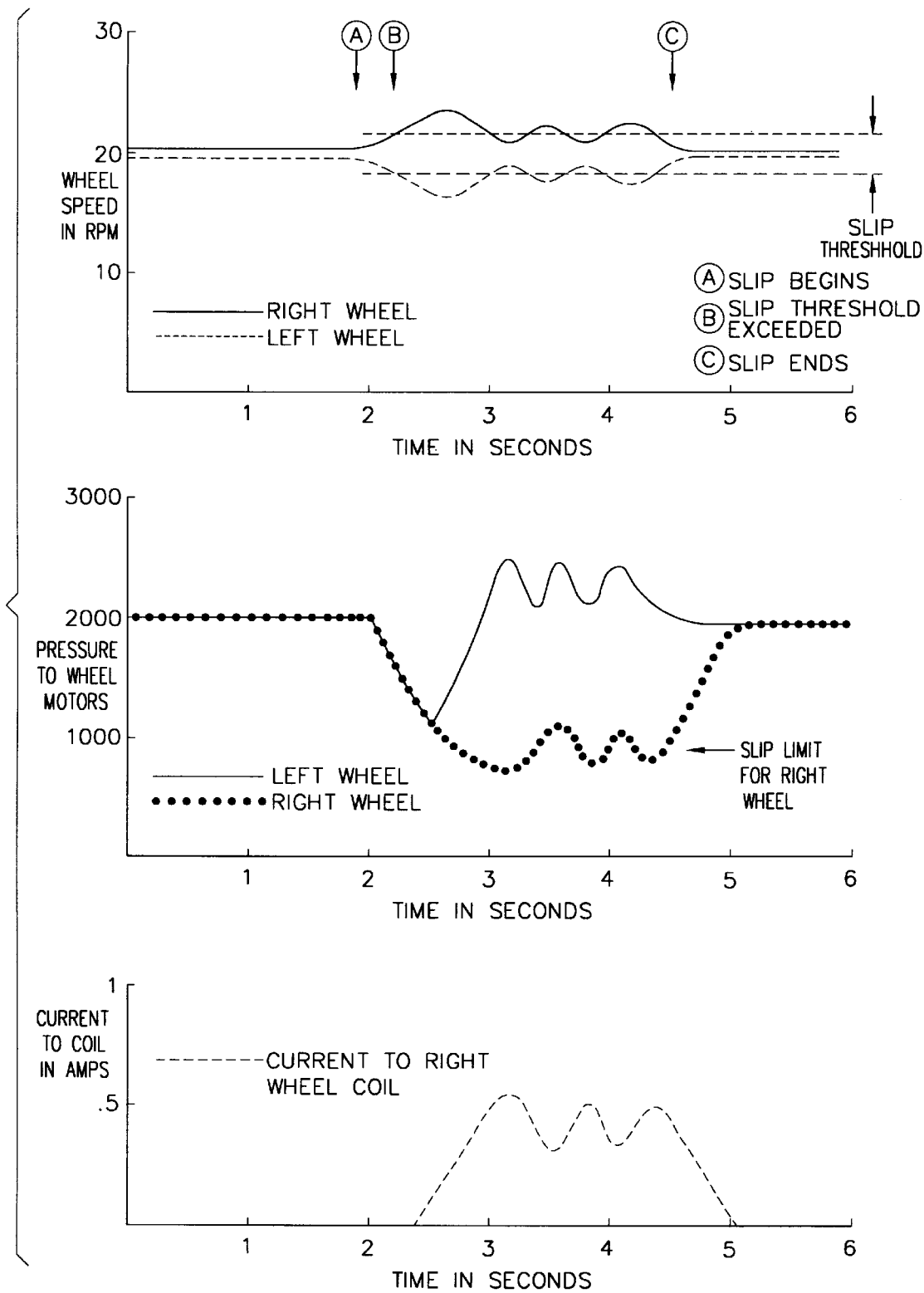
FIG. 4 is a three-part chart depicting the anticipated relationship of wheel speed, pressure to wheel motors, and current to solenoid coil over the time period from the beginning of wheel slippage to wheel slippage ending.

FIG. 4 is a more complete chart showing movement of variables during the time when a wheel slippage is being corrected. At the bottom of the chart is shown the current sent to the solenoid coil by the computer. In the middle of the chart is shown the pressure response of both the motor for the slipping (right) wheel, and the pressure response of the motor for the non-slipping (left) wheel. At the top of the chart are shown the wheel speeds as a function of the time, the same as previously illustrated in FIG. 1. It will be noted that pressure across the motor for the slipping right wheel drops rapidly, but pressure across the motor for the non-slipping left wheel temporarily rises above its previous level.

Traction Control Module for Reversibility

FIGS. 5*a* through 5*e,* 6*a,* and 6*b* schematically illustrate the presently preferred physical embodiment of a traction control valve module in accordance with the invention.

Figure 5B:
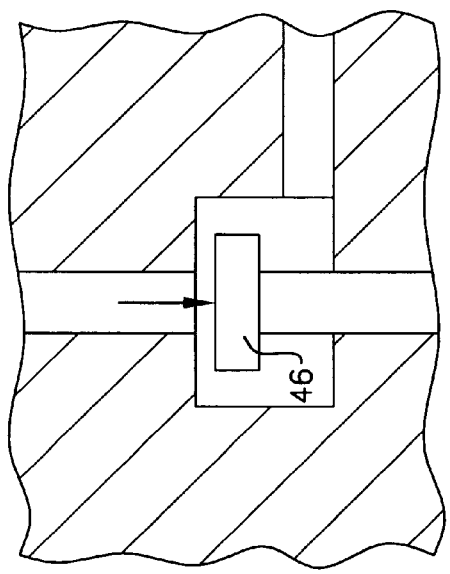
Figure 5A:
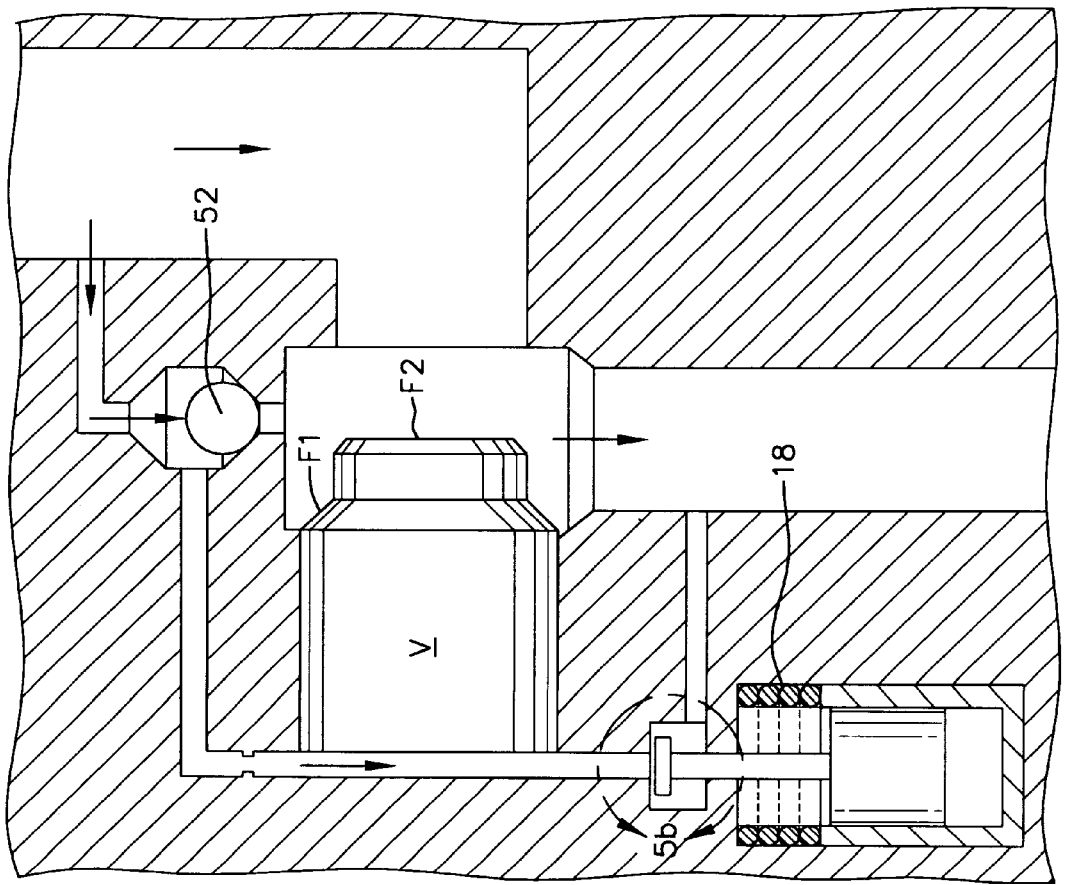
FIG. 5a is a cross-sectional schematic view of the presently preferred form of traction control valve module in accordance with the invention, in an open flow condition when the associated wheel is not slipping.

FIGS. 5a and 5b show the module in an open flow condition with both valves open during normal vehicle operation, while FIGS. 5c, 5d, and 5e show both valves nearly closed when responding to wheel slippage.

As shown in FIGS. 5a and 5b, valve V has its rear end face R aligned with one side of the branch path B, while its outer front face F2 protrudes only slightly into main path M, and its inner front face F1 is aligned with one side of path M. This is considered to be the fully open position of valve V.

In FIGS. 5a and 5b, valve member 46 of solenoid valve P appears to be more nearly closed than open, but it is in fact open by a considerable amount, allowing fluid flow down the branch path B and back into main path M on the downstream side of valve V. The enlargement of FIG. 5b shows that valve member 46 of solenoid valve P leaves a considerable opening. FIGS. 5c, 5d, and 5e show the nearly closed position of both valves.

Figure 6B:
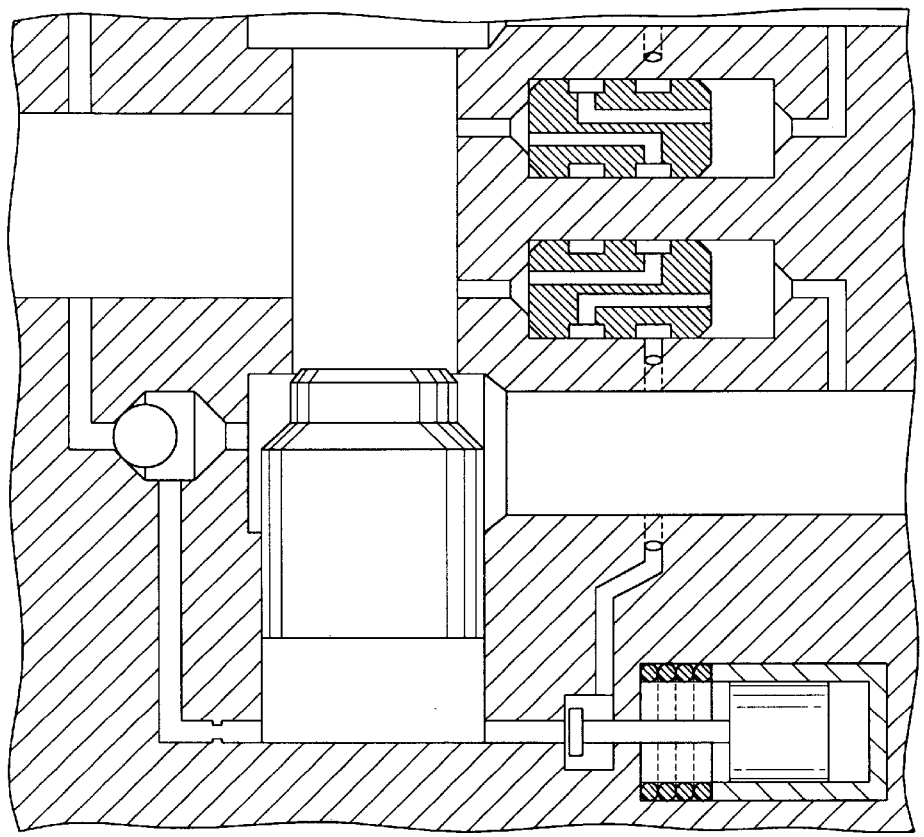
FIG. 6b is a schematic view of the control valve module in a reverse closed flow position.
Figure 6A:
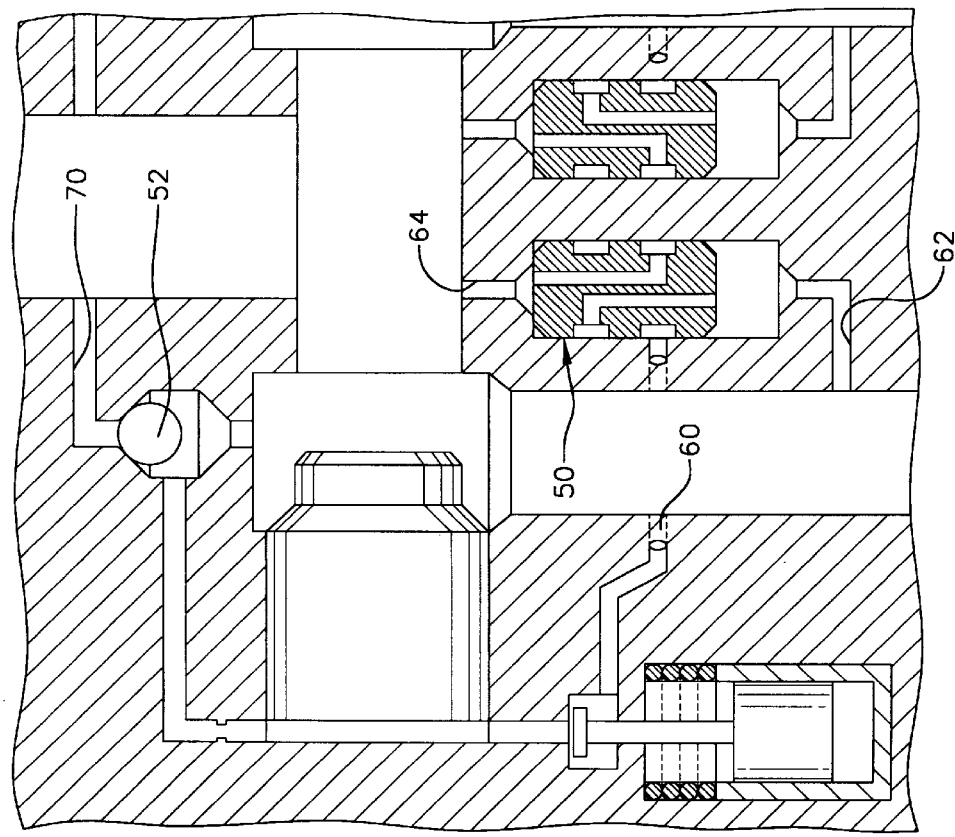
FIG. 6a is a schematic view of the control valve module in a reverse open flow position.

Reference is now made to FIGS. 6a and 6b which show the actual preferred construction of the control module. Two extra valves are provided so that the direction of fluid flow through branch path B will remain the same even when the direction of flow through main path M is reversed in order to reverse the direction in which the wheels rotate and the vehicle travels. The module has essentially the same configuration as described for the one-way flow design except for the addition of a sliding shuttle valve 50 and a two-way directional ball valve 52. Instead of feeding directly into main flow path M as in the one-way flow design, branch path B feeds into shuttle valve 50 by a channel 60. An additional pair of channels 62 and 64 permit fluid contact between shuttle valve 50 and main flow path M downstream and upstream, respectively, of sliding valve V. Two-way directional ball valve 52 is disposed in branch path B upstream of orifice O. A channel 70 communicates flow to two-way directional ball valve 52 only when flow is in the forward direction as shown in FIG. 1.

With the invention having been thus described, the manner in which it operates as related to the reversible flow embodiment will now be discussed. The hydrostatic system is closed loop and reversible pump 10 feeds each actuator in a parallel configuration. Referring to FIG. 6, the system operates in an identical fashion to that previously described. Pressurized hydraulic fluid passes through each motor W1 or W2 before its associated traction control valve module. Shuttle valve 50 will be displaced accordingly. Two-way directional ball valve 52 will permit fluid to enter through channel 70 past orifice O, past solenoid valve P into shuttle valve 50 and finally exiting into main flow path M through channel 62. The tandem combination of two-way directional ball valve 52 and shuttle valve 50 permits flow past solenoid valve P in only one direction such that Pc will always approach Pin when sliding valve V is nearing a fully closed position.

Two Control Valve Modules in One Package

FIGS. 6a and 6b each show in schematic form the operative part of one control valve module, plus a portion of the operative part of another. It is convenient and advantageous to package a pair of identical control valve modules in a single package, since in most situations such modules are required in pairs for traction control of a vehicle.

While a presently preferred embodiment of the invention has been illustrated and described in some detail in order to comply with the patent laws, it will be understood that the scope of the invention is not to be limited accordingly, but instead will be determined by the appended claims.

What I claim is:

1. For use with a hydraulic fluid source, a rapid response hydraulic control module for at least one load of at least one hydraulic motor and at least one pair of wheels driven by the motor, the module comprising:

a) means defining a main flow path, the main flow path means having upstream and downstream ends, a chamber, a valve seat, and means to receive hydraulic fluid from the fluid source;

b) means defining a branch flow path in parallel with the main flow path means, the branch flow path means having upstream and downstream ends, and upper and lower legs, the branch flow path means defining means being adapted to receive hydraulic fluid from the hydraulic fluid source at its upstream end, and to communicate with the load at its downstream end;

c) a slidable valve member in the main flow path means, the slidable valve member having longitudinally separated front and rear end faces in communication with the main and branch flow path means, respectively;

d) an orifice in the upper leg of the branch flow path means for restricting the flow of hydraulic fluid from the hydraulic fluid source to the rear end face of the slidable valve member;

e) proportional solenoid control valve means in the lower leg of the branch flow path means between the rear face of the slidable valve and the load, the proportional solenoid valve means acting as a pilot valve for controlling sliding movement of the slidable valve member and incrementally restricting or opening the flow through the main flow path means;

f) the configuration of the main and branch flow path means being such that when the control valve means is open, the pressure on the rear end face is equal to the pressure on the front face to thereby balance the slidable valve member;

g) the chamber of the main flow path can receive the front end face;

h) the front end face having a projection forming a secondary face that has an area less than the total front end face area so that the partial closing of the control valve means causes the slidable valve member to move partially into the chamber and the secondary face to come closer to said valve seat, whereby the main flow path partially closes;

i) a shuttle valve; and j) a two-way directional ball valve, the two way directional ball valve and the shuttle valve being coupled to the main flow path means such that when the direction of fluid flow from the source reverses, the direction of flow past the slidable valve member reverses, but fluid flow through the branch flow path means continues in the same direction as before.

2. The rapid response hydraulic control module claimed in claim 1 wherein the surface areas of the longitudinally separated front and rear end faces of the slidable valve member are substantially equal.

3. The rapid response hydraulic control module claimed in claim 2 including response means comprising:

a) computer means capable of generating a wheel slip signal indicative of the difference in rotational speed between slipping wheels and non slipping wheels of the load; and b) the proportional solenoid valve means being controlled by the computer signal to close the branch flow path means proportionately to the difference in rotational speed between slipping wheels and non-slipping wheels of the load.

* * * * *